(12) United States Patent
Behera et al.

(10) Patent No.: US 10,007,560 B2
(45) Date of Patent: Jun. 26, 2018

(54) CAPACITY AND LOAD ANALYSIS USING STORAGE ATTRIBUTES

(71) Applicant: VMware, Inc., Palo Alto, CA (US)

(72) Inventors: Somik Behera, San Francisco, CA (US); Samuel P. McBride, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days. days.

(21) Appl. No.: 14/189,963

(22) Filed: Feb. 25, 2014

(65) Prior Publication Data

US 2014/0317618 A1    Oct. 23, 2014

Related U.S. Application Data

(63) Continuation of application No. 13/116,955, filed on May 26, 2011, now Pat. No. 8,661,182.

(51) Int. Cl.
*G06F 9/50* (2006.01)
*G06F 9/455* (2018.01)

(52) U.S. Cl.
CPC ............ *G06F 9/5077* (2013.01); *G06F 9/455* (2013.01)

(58) Field of Classification Search
CPC ............................... G06F 9/5077; G06F 9/455
See application file for complete search history.

(56) References Cited

U.S. PATENT DOCUMENTS

| | | | |
|---|---|---|---|
| 7,437,730 B2* | 10/2008 | Goyal | 718/105 |
| 7,552,438 B1* | 6/2009 | Werme et al. | 718/104 |
| 7,668,703 B1* | 2/2010 | Rolia et al. | 703/2 |
| 8,326,970 B2 | 12/2012 | Cherkasova et al. | |
| 8,413,147 B2 | 4/2013 | Shen et al. | |
| 8,433,802 B2 | 4/2013 | Head et al. | |
| 2006/0031509 A1* | 2/2006 | Ballette et al. | 709/226 |
| 2007/0204266 A1* | 8/2007 | Beaty et al. | 718/1 |
| 2007/0271560 A1* | 11/2007 | Wahlert et al. | 718/1 |
| 2008/0271038 A1 | 10/2008 | Rolia et al. | |
| 2009/0055834 A1* | 2/2009 | Ding et al. | 718/104 |
| 2012/0102291 A1 | 4/2012 | Cherian et al. | |

OTHER PUBLICATIONS

Somik Behera, et al., "Capacity and Load Analysis in a Datacenter," U.S. Appl. No. 12/786,918, filed May 25, 2010.

* cited by examiner

*Primary Examiner* — Michael Alsip
(74) *Attorney, Agent, or Firm* — Thomas | Horstemeyer, LLP

(57) ABSTRACT

A method includes determining a capacity model that configures computing resource capacity for a capacity container. The computing resource capacity includes a first storage attribute for an amount of storage in a storage component. A load model is determined that configures load for the capacity container. The load includes a second storage attribute for a storage requirement for a virtual machine. A profile of a virtual machine unit is determined for estimating available capacity in a capacity container. The profile is determined using virtual machine attributes for a set of virtual machines, wherein the virtual machine unit includes a storage requirement based on storage requirements for the set of virtual machines. The profile of the virtual machine unit is fit into available capacity. A number of virtual machine units is determined based on the fitting, the number of virtual machine units being a measure of available capacity.

20 Claims, 14 Drawing Sheets

Fig. 9

What if Scenario    1100

1102

Specify mix of new virtual machines to be added
Enter number of virtual machines of each profile mix

| View |
|---|
| Change Type |
| Scenario |
| Configuration |
| VM Count |
| Ready to Complete |

Review the list of machines selected. Increase the multiplier to create more than one of any machine.

| VM Count | Name | vCPU Total | CPU Util | Mem Total | Mem Util | De |
|---|---|---|---|---|---|---|
| 8 | Invisible vcops | 2 x 2.3 GHz | | 4098 MB | | |
| 101 | OpenFilerISO | 1 x 2.0 GHz | 3% | 256 MB | | |
| 10 | sbehera-cmvm | 1 x 2.3 GHz | 3% | 2048 MB | 105% | |

If needed, add a multiplier to the virtual machine profile

Page 1 of 1    Displaying 1 - 3 of 3

VM Population

Population Summary
RealCluster
vCPU:         22 CPU Cores at 0.07GHz Usage
vMem:         24.25GB at 2.1GB Usage
Virtual Disk: 221GB at 143.17GB Usage
Disk I/O:     1.42MBps Usage

Population Details
Small VM Profile
vCPU:            2 vCPU at -% Utilization
vMem:            2GB at -% Utilization
Virtual Disk:    20GB at 13.52GB Usage
Virtual Machines: 4

Medium VM Profile

Host Population
|           | CPU              | Memory  |
|---|---|---|
| Smallest  | 4 x 1.99GHz      | 8GB     |
| Largest   | 8 x 2.27GHz      | 31.99GB |

[ Help ]        [ < Back ] [ Next > ]    [ Cancel ]

Fig. 11

CAPACITY AND LOAD ANALYSIS USING STORAGE ATTRIBUTES

This application is a continuation of U.S. application Ser. No. 13/116,955 (now U.S. Pat. No. 8,661,182), filed May 26, 2011, which is hereby incorporated by reference herein in its entirety.

BACKGROUND

Capacity management is used to manage computing resources in a data center. Effective capacity management may strive to accomplish two objectives of efficiency and availability. Efficiency is the efficient use of existing capacity and also the minimizing of any waste of computing resources. Availability is leaving enough capacity headroom to accommodate any spikes in computing resource demands. These two objectives may conflict with each other. For example, right-sizing computing resource capacity to achieve high efficiency may come at the cost of sacrificing capacity availability. Also, provisioning an additional capacity buffer may reduce capacity efficiency. Accordingly, capacity planning tools to balance the objectives may be very helpful.

Capacity management in a virtual environment may introduce more challenges in comparison with managing just physical computing resources. When just physical computing resources are taken into account, capacity planning tools can rely on a 1-1 mapping between computing resource capacity and computing resource workload. However, in a virtual environment, the physical computing resources are shared across multiple virtual machines. Other features of virtualization, such as high availability (HA), distributed resource scheduling (DRS), fault tolerance (FT) impact the true capacity requirements of a virtual machine and make the process of capacity planning more challenging and unreliable. Further, the virtual environment has overcommitment of resources, calculation of entitlement as a capacity estimate instead of just relying on configured size where entitlement is based on configuration, shares, and limits, and the use of resource pools also compound the problem. Further, when storage-related features, such as linked clones and thin provisioning, are used in the virtualization environment, the process of estimating capacity requirements becomes even more difficult.

SUMMARY

In one embodiment, a method for managing capacity in a capacity container is provided. The method includes determining a capacity model that configures computing resource capacity for the capacity container. The computing resource capacity includes a first storage attribute for an amount of storage in a storage component. A load model is determined that configures load for the capacity container. The load includes a second storage attribute for a storage requirement for a virtual machine. A profile of a virtual machine unit is determined for estimating available capacity in a capacity container. The profile is determined using virtual machine attributes for a set of virtual machines in the capacity container, wherein the virtual machine unit includes a storage requirement based on storage requirements for the set of virtual machines. The profile of the virtual machine unit is fit into available capacity where the fitting is determined based on fitting the virtual machine unit on one or more hosts in the capacity model having access to an amount of storage in a storage component that meets the storage requirement for the virtual machine unit. A number of virtual machine units is determined based on the fitting, the number of virtual machine units being a measure of available capacity.

In one embodiment, the fitting process places a virtual machine on a host and attempts to determine if the storage requirement for the virtual machine is satisfied by the amount of storage in the storage component accessible to the host.

In one embodiment, a method includes: determining a set of storage components configured with a first storage attribute specifying an amount of storage for a storage component; determining a set of hosts, wherein hosts in the set of hosts are coupled in a topology to storage components in the set of storage components; determining a set of virtual machines, wherein virtual machines are configured with a second storage attribute specifying a storage requirement; and placing a virtual machine unit on one or more hosts in the set of hosts, the virtual machine unit determined based on the set of virtual machines, wherein the virtual machine unit includes a storage requirement determined based on the storage requirement for virtual machines in the set of virtual machines. For each placement on a host in the one or more hosts, the method performs: determining if the host has access to available storage in a storage component to satisfy the storage requirement for the virtual machine unit based on the topology; determining, by a computing device, a fit of the virtual machine unit on the host if the host has access to available storage to satisfy the storage requirement for the virtual machine unit and not determining a fit if the host does not have access to available storage to satisfy the storage requirement for the virtual machine unit; and estimating a number of virtual machine units based on a number of virtual machines fit on hosts with access to available storage to satisfy the storage requirement for the virtual machine unit, the number of virtual machine units being a measure of available capacity.

In one embodiment, the virtual machine unit is an average virtual machine determined based on the virtual machine attributes for the set of virtual machines.

In one embodiment, a non-transitory computer-readable storage medium is provided containing instructions for controlling a computer system to be operable to: determine a capacity model that configures computing resource capacity for the capacity container, the computing resource capacity including a first storage attribute for an amount of storage in a storage component; determine a load model that configures load for the capacity container, the load including a second storage attribute for a storage requirement for a virtual machine; determine a profile of a virtual machine unit for estimating available capacity in a capacity container, the profile determined using virtual machine attributes for a set of virtual machines in the capacity container, wherein the virtual machine unit includes a storage requirement based on storage requirements for the set of virtual machines; fit the profile of the virtual machine unit into available capacity, wherein the fitting is determined based on fitting the virtual machine unit on one or more hosts in the capacity model having access to an amount of storage in a storage component that meets the storage requirement for the virtual machine unit; and determine a number of virtual machine units based on the fitting, the number of virtual machine units being a measure of available capacity.

The following detailed description and accompanying drawings provide a more detailed understanding of the nature and advantages of the present invention.

BRIEF DESCRIPTION OF THE DRAWINGS

FIG. 9 shows an interface for adding a new virtual machine configuration according to one embodiment.

FIG. 11 shows an interface to input a multiplier for adding existing virtual machines according to one embodiment.

DETAILED DESCRIPTION

In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

System Overview

Figure 1:
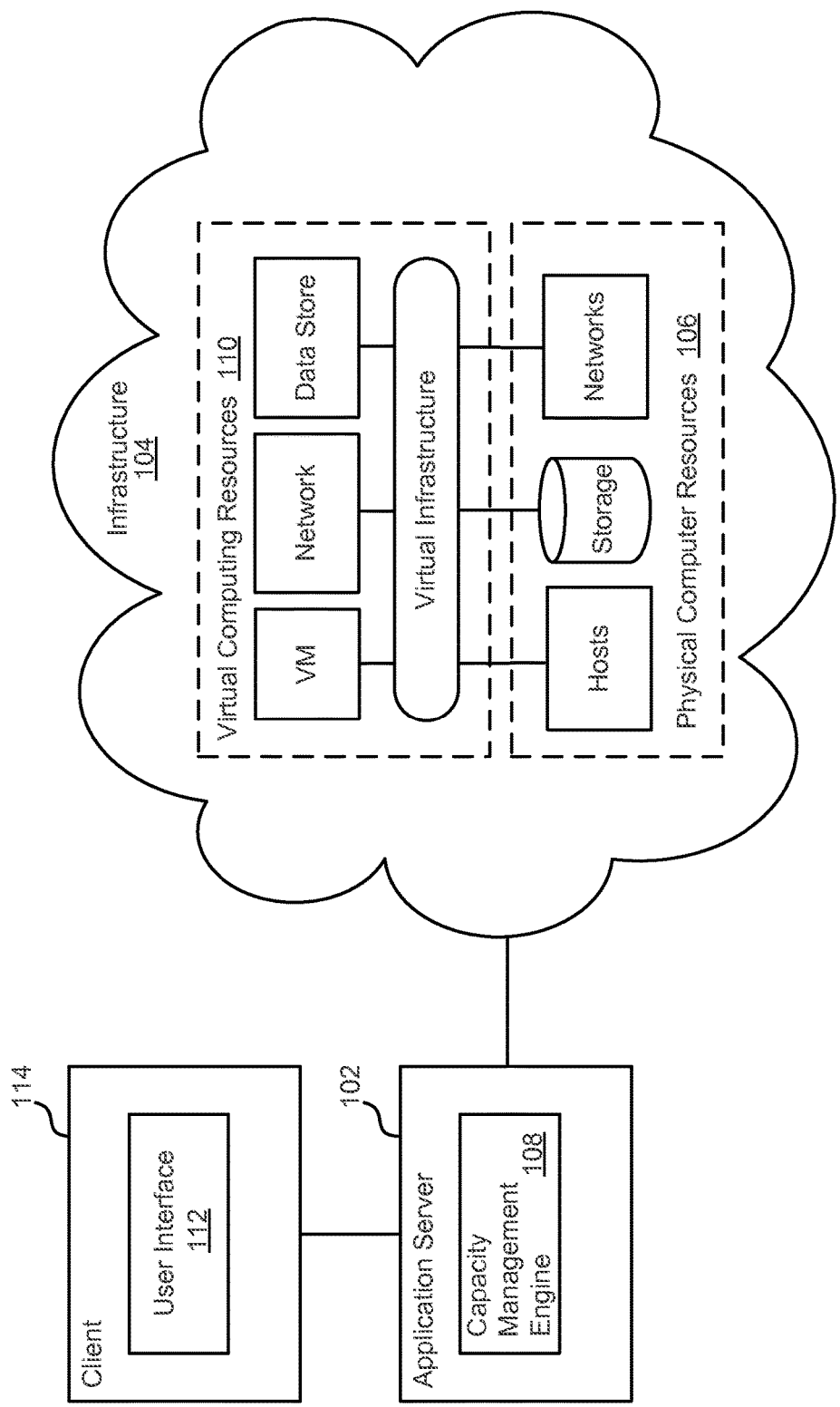
FIG. 1 depicts a system for capacity management according to one embodiment.

FIG. 1 depicts a system 100 for capacity management according to one embodiment. System 100 includes an application server 102, an infrastructure 104, and a client 114. Application server 102 includes a capacity management engine 108.

Infrastructure 104 may be associated with a data center. The data center includes computing resources, such as physical computer systems, virtual computer systems (referred to as virtual machines (VMs)), networks, storage systems, or other resources needed to operate the data center. The computing resources may be classified as physical or virtual. Physical computing resources 106 include hosts (e.g., servers), data storage devices (e.g., storage disks), and networks (e.g., storage area networks (SANs)). Virtual computing resources 110 are virtualized instances of physical computing resources 106 (e.g., a virtual machine (VM), virtual storage, and virtual networks). Virtual storage may be a datastore, a virtual machine disk (VMDK), or other virtual storage components. For discussion purposes, the term datastore will be used, but it will be understood that other virtual storage components may be used in place of a datastore. Also, when memory is used, memory is considered storage internal to a host. If a particular host has local storage (e.g., a local disk, not connected via the network), the local storage is exposed as a datastore. Also, the physical storage location of the datastore may be over the network as well as on the local system not connected via the network. The entities infrastructure 104 will be described in more detail below.

Capacity management engine 108 performs a capacity analysis that provides trending and forecasting for infrastructure 104. Capacity and/or load models may be created, modified, and simulated (referred to as a "What-if" simulation). Particular embodiments use storage attributes in simulating the capacity and/or load models. The storage attributes may be used in addition to other attributes for computing resources, such as computer processing unit (CPU) attributes and memory attributes.

A user interface 112 on client 114 may be used by a user to connect to capacity management engine 108. As will be described in more detail below, user interface 112 may be used to modify capacity and/or load models. Further, "what if" simulations may be performed using the modifications, and visualizations of the simulations may be displayed on interface 112.

Figure 2:
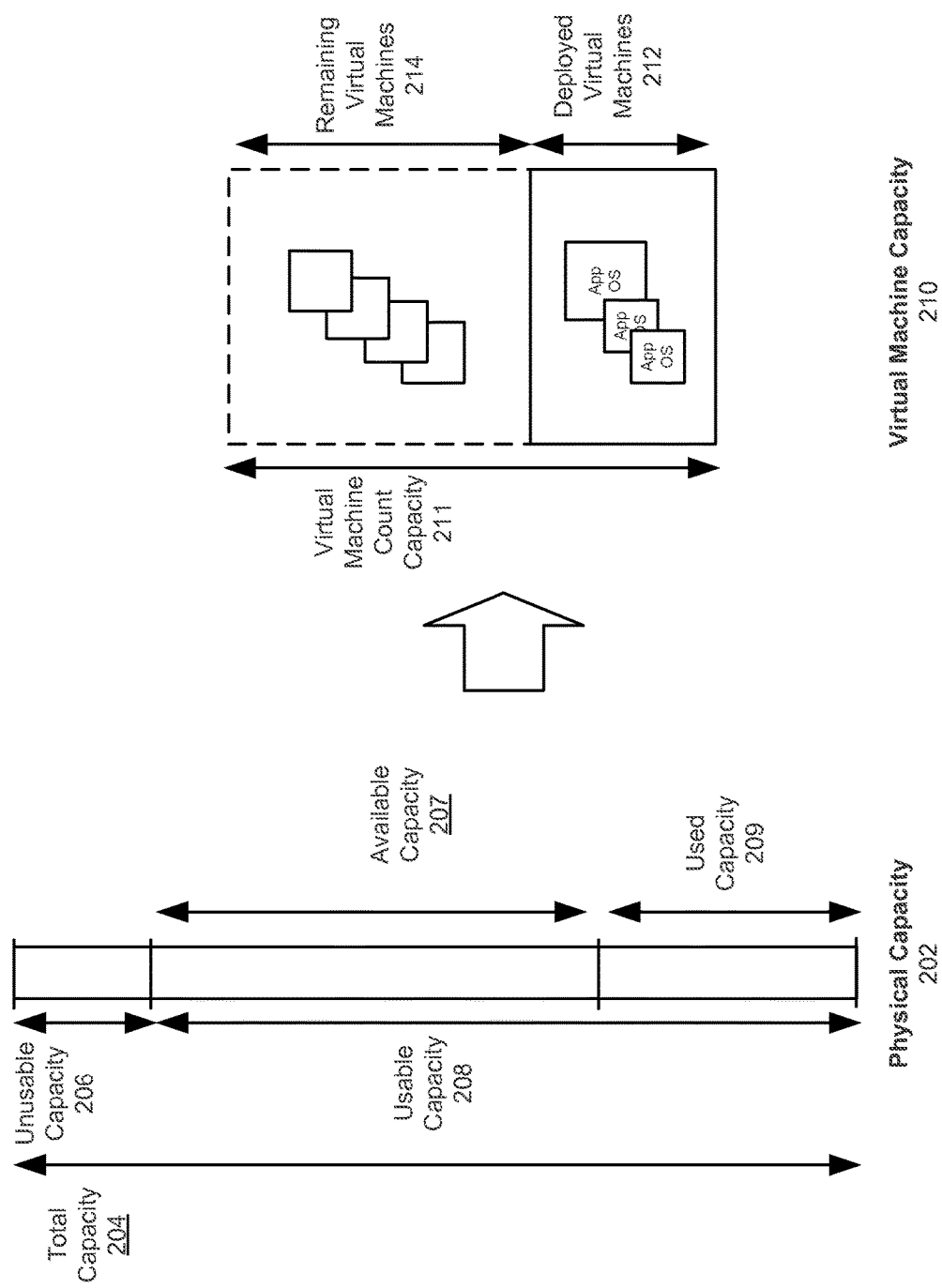
FIG. 2 depicts bar graphs showing a relationship between physical capacity and virtual machine capacity according to one embodiment.

In one embodiment, the capacity analysis may be determined based on virtual machine capacity. For example, instead of stating that a certain amount of capacity, such as storage, memory, or CPU, is available, the capacity is represented in virtual machine units, such as capacity may be equal to a certain number of virtual machines units. The virtual machine unit may be an average virtual machine, which is average sized virtual machine that is determined. For example, an average virtual machine (AVM) may be AVM={configured CPU cores, configured CPU demand capacity, CPU demand (averaged over a time interval), configured Memory, Memory consumption (averaged over the time interval), configured disk, Disk Consumption (in absolute units)}, where the time interval used to compute averages is user configurable. Other definitions of an average virtual machine that takes into account CPU, memory, and disk storage may also be used. The translation of physical capacity to virtual machine units allows a practical visualization of capacity. FIG. 2 depicts bar graphs showing a relationship between physical capacity and virtual machine capacity according to one embodiment. Physical capacity is shown at 202. Different physical computing resources may be used to determine physical capacity, such as CPU, memory, disk space, disk input/output bandwidth, and network input/output bandwidth.

At 204, total capacity is a total amount of computing resources provisioned in a capacity container, which may be a grouping of computing resources. For example, a capacity container may include a data center, physical host, cluster of hosts, or virtualized resource pool. A virtualized resource pool may be an abstraction of a group of physical computing devices (e.g., hosts or data storage) where the computing resources are pooled for the group.

At 206, unusable capacity is capacity that will not be available for use by virtual machines. Various reasons may exist for having unusable capacity, such as high availability (HA) reservation, overhead, or a capacity buffer. HA reservation may be the capacity needed to meet failover commitments when host failures occur. Overhead may be the amount of capacity that is needed to run any virtualization services. The capacity buffer is capacity that is set aside as a buffer against spikes in demand.

At 208, usable capacity is the capacity available for use by virtual machines. Usable capacity equals the total capacity minus the unusable capacity. Usable capacity may also mean the total capacity in some instances. At 209, used capacity is the capacity used by all virtual machines currently running in the capacity container. Available capacity 207 is capacity in which new virtual machines can be deployed.

Virtual machine capacity is shown at 210 and may be the physical capacity measured in virtual machine units. At 211, virtual machine count capacity is the number of virtual machines that fit within the used capacity and available capacity. Although unusable capacity is not taken into account in this example, particular embodiments may place virtual machines in unusable capacity. At 212, deployed virtual machines are shown and represent the capacity used by currently-deployed virtual machines in the capacity container. Deployed virtual machines have been placed on hosts and may be included regardless of whether they are powered on or off.

At 214, remaining virtual machines are an estimate of the number of virtual machines that could be deployed in available capacity. The available capacity may be measured in terms of virtual machine unit. In one embodiment, the virtual machine unit may be an average virtual machine. The average virtual machine may assume that any new virtual machine that is added to the capacity container will be represented by the average virtual machine. The average virtual machine may be calculated based on different information, such as the definition described above. In one embodiment, the virtual machines that are included in the capacity container are used to determine the average virtual machine. This may ensure that new virtual machines may resemble the current population of virtual machines.

In one embodiment, virtual machines in the capacity container may be categorized into a mix of small, medium, and large virtual machines. The small, medium, and large virtual machines may have different capacity attributes, such as a CPU demand attribute, a memory demand attribute, and a storage demand attribute. The capacity attributes may vary based on the size of the virtual machine. For example, small virtual machines consume less CPU than larger virtual machines. Further, smaller virtual machines consume less memory than larger virtual machines and have less storage demands than larger virtual machines.

The average virtual machine may be determined in different ways. For example, the capacity of virtual machines in the capacity container is added and then averaged by the number of virtual machines in the capacity container. This may determine the CPU, memory, and storage capacity. For demand, an additional step may be considered of demand over a time-period (e.g., a user-configurable time period) before averaging the demand. For example, the CPU, memory, and storage demands for virtual machines in the capacity container are added and then averaged by the number of virtual machines in the capacity container over a time period. Additional details of calculating an average virtual machine for CPU and memory are described in U.S. patent application Ser. No. 12/786,918, entitled "Capacity and Load Analysis in a Datacenter, filed on May 25, 2010 (hereinafter the Behera 1 application), which is hereby incorporated by reference in its entirety for all purposes.

Particular embodiments provide visualization of a trend by carrying out a "what if" simulation using virtual machine units. The "what if" simulation simulates changes to the capacity container and is used to measure the impact of any changes to virtual machines, storage, or hosts in the capacity container. Different "what if" scenarios may be configured by a user using workflows.

Workflows

The workflows include a capacity workflow and a load workflow. The capacity workflow configures host and datastore attributes in a capacity model. Also, the load workflow configures virtual machine attributes in a load model. A user, for example and without limitation, a datacenter administrator or an information technology ("IT") manager may perform the configuration. Once configured, capacity management engine 108 analyzes the load with respect to the capacity to determine "what if" scenarios.

Figure 3:
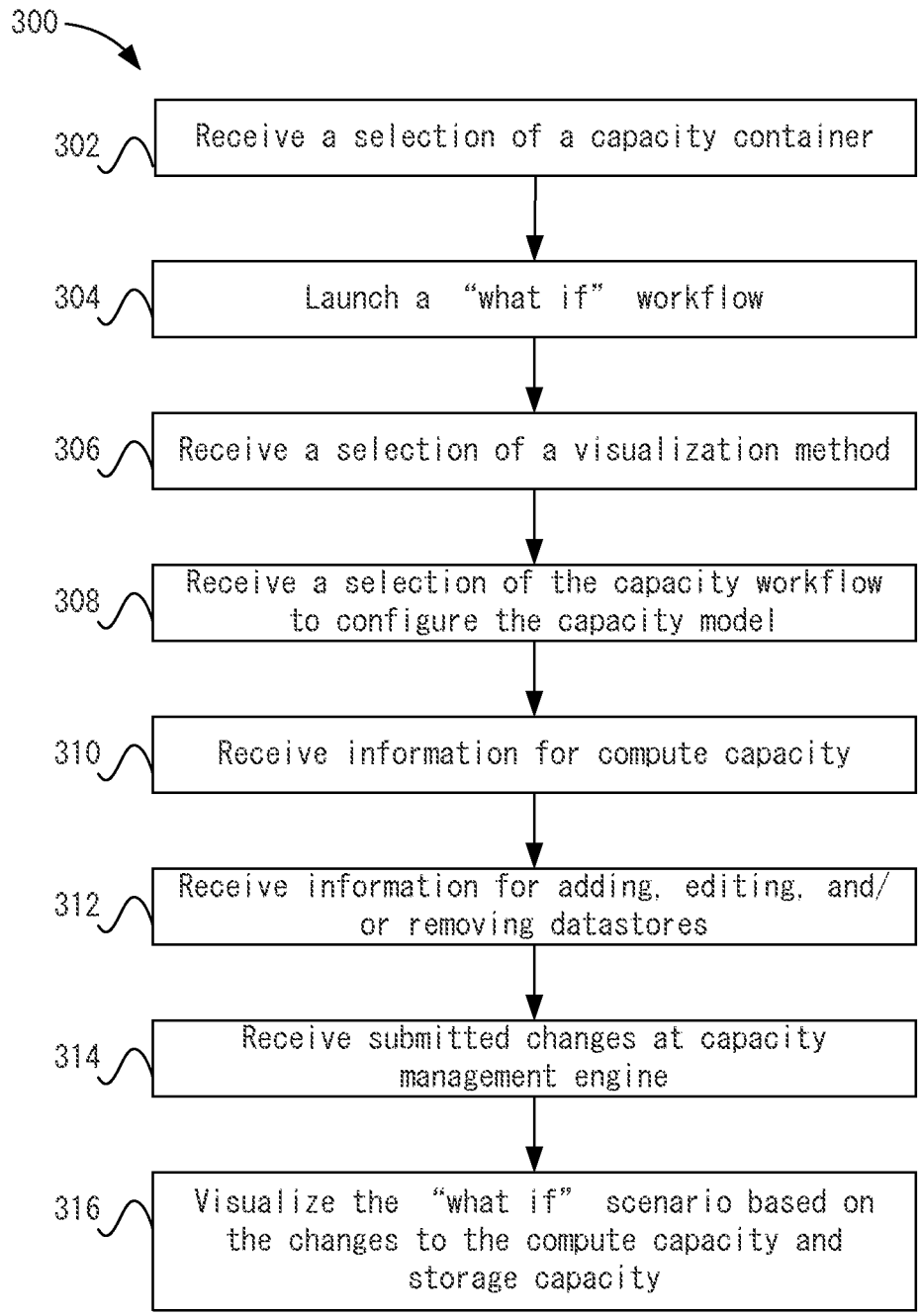
FIG. 3 depicts a simplified flowchart of a method for configuring a capacity model according to one embodiment.
Figure 4:
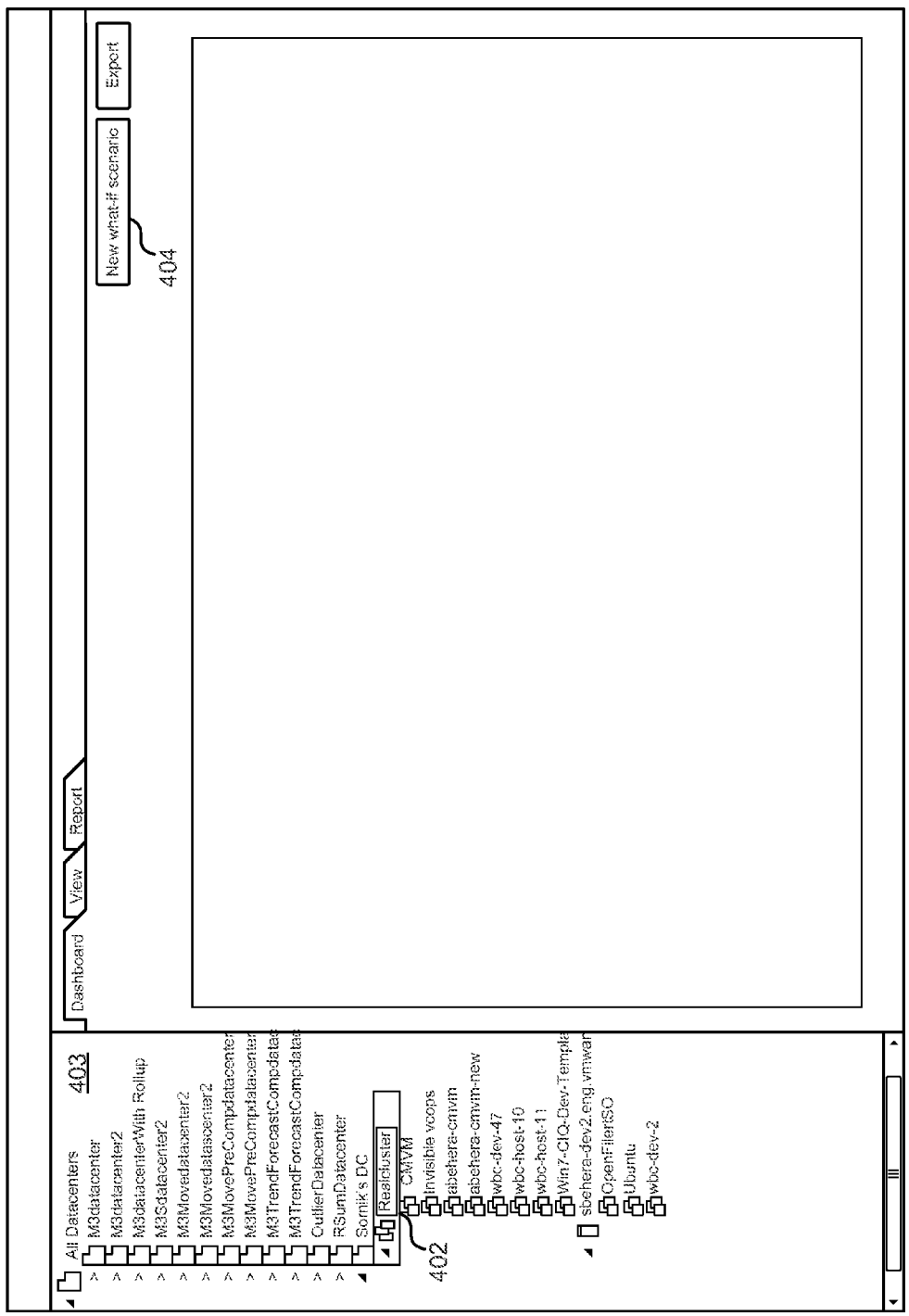
FIG. 4 shows an interface in which a selection of a capacity container is received according to one embodiment.

FIG. 3 depicts a simplified flowchart 300 of a method for configuring a capacity model according to one embodiment. At 302, a selection of a capacity container is received. For example, FIG. 4 shows an interface 400 in which a selection of a capacity container at an icon 402 is received according to one embodiment. The capacity container for which a capacity and/or load model will be created represents a desired capacity container from a list of capacity containers displayed in a left-hand panel 403 in interface 400. The capacity container may be a cluster of hosts (and associated storage and network resources), a single host (and associated storage and network resources), or other groupings in infrastructure 104.

Referring back to FIG. 3, at 304, a "what if" workflow is launched. For example, referring to FIG. 4, at 404, a selection of an icon 404 for a new "what if" scenario may be received to launch a "what if" wizard. The "what if" workflow allows a user to simulate possible changes to capacity or load in the capacity container.

Referring back to FIG. 3, at 306, a selection of a visualization method is received. For example, a user may select from different visualization methods. In one embodiment, the options that are available are "virtual machine capacity—trend", "virtual machine capacity—summary", and "cluster or host capacity usage—trend". The "virtual machine capacity—trend" option generates a graph that forecasts the trend. The "virtual machine capacity—summary" option generates a summary of the number of virtual machines similar to graph 200 shown in FIG. 2 or another summary. The "cluster or host capacity usage—trend" option shows "raw" units (e.g., across the CPU, Memory, Disk, Disk I/O dimensions) instead of using the average virtual machine units. Other options are also available for different "what if" scenarios.

After the visualization method is selected, a capacity model and/or load model may be configured. Configuring the capacity model will be described first. At 308, a selection of the capacity workflow is received to configure the capacity model. In this case, the selection may select an option to configure hosts and/or datastores. This may model the adding, changing, or removing host and/or datastore capacity.

Figure 5:
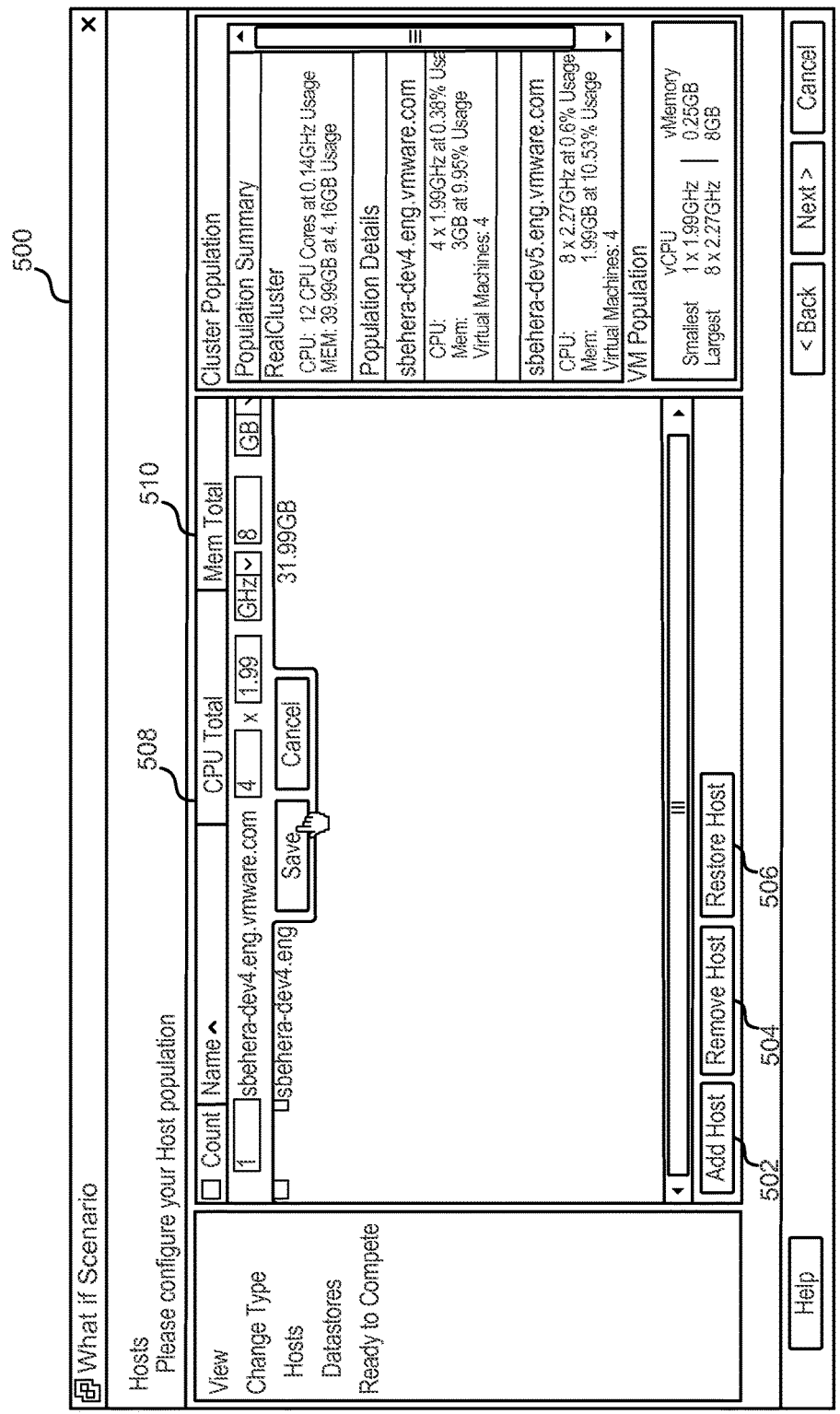
FIG. 5 depicts an example of an interface for configuring compute capacity according to one embodiment.

At 310, information is received for compute capacity. For example, FIG. 5 depicts an example of an interface 500 for configuring compute capacity according to one embodiment. Interface 500 allows a user to add a host, remove a host, or restore a host. For example, a user may add a host by selecting an add host icon 502, may remove a host by selecting a remove host icon 504, and may restore a host by selecting a restore host button icon 506. By providing icons 502, 504, and 506 together in interface 500, the adding, removing, and restoring of hosts is simplified. From the same interface 500, all three actions may be performed.

In this example, a host is being added to the capacity container. Compute capacity may configure attributes for the added host. For example, attributes that may be configured include a "CPU Total" in an entry box 508 and a "Memory Total" in an entry box 510. For example, this host includes four CPU cores that have a CPU speed of 1.99 GHz. Also, the memory total is 8 gigabytes (GB). Other attributes for hosts may also be configured.

Other options that may be performed include removing hosts and restoring hosts. Removing a host removes the host from the capacity container. Also, a host may be restored to the capacity container. For example, a host that had been deleted may be re-added to the capacity container. Additional information on configuring hosts may be found in the Behera 1 application.

Figure 6:
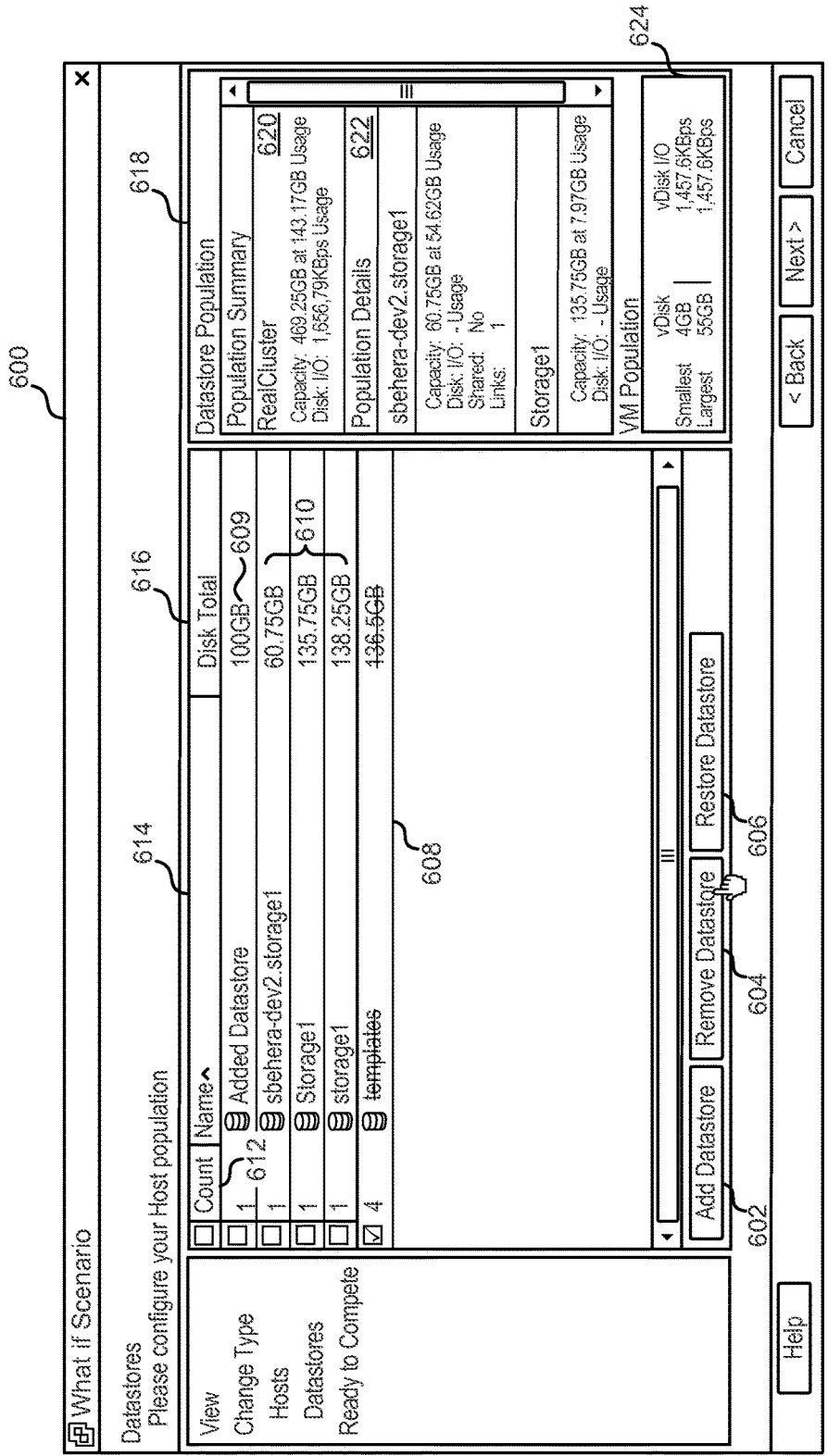
FIG. 6 shows an interface for adding, editing, and removing datastores according to one embodiment.

Referring back to FIG. 3, at 312, information for adding, editing, and/or removing datastores is received. For example, FIG. 6 shows an interface 600 for adding, editing, and removing datastores according to one embodiment. As shown, adding a datastore may be performed by selecting an icon 602; removing a datastore may be performed by selecting an icon 604; and restoring a datastore may be performed by selecting an icon 606.

At 608, a datastore of "templates" has been removed. The datastore may be removed by selecting the datastore and icon 606. Also, a datastore may also be added. For example, at 609, a datastore of "Added Datastore" is added to the capacity container. Other datastores that were already included in the capacity container are shown at 610.

Different information may be configured for the datastores. For example, a "Count" column 612 includes a count of datastores, which is the number of datastores that are to be included in the capacity container. A "Name" column 614 is the name of the datastore. Also, a "Disk Total" column 616 is the amount of disk space included in the datastore. Other attributes may also be configured.

A "Datastore Population" section 618 summarizes data store attributes in the capacity container. A "Population Summary" section 620 shows the total capacity and disk input/output (I/O) for the selected capacity container of "RealCluster". This aggregates the capacity and disk I/O for all datastores in the capacity container. The capacity is 469.25 GB with 143.17 GB available for use. The disk I/O is 1.656.79 kilobytes per second (KBps) usage.

A "Population Details" section 622 summarizes the attributes of each datastore. Details are shown for two of the datastores, but further details for other datastores are available by scrolling down section 622. A "Capacity" attribute shows how much capacity is available and how much capacity is being used. For example, the "sbehera-dev2:storage1" datastore has a capacity of 60.75 GB with 54.62 GB available for use. The storage attribute "Shared" indicated whether the datastore is shared among hosts. Also, the storage attribute "Links" is the number of links to hosts.

A "VM Population" section 624 summarizes storage attributes for a smallest VM and a largest VM. The storage attributes include a virtual disk (vDisk) attribute and a virtual disk I/O (vDisk I/O) attribute. The smallest virtual machine may use 4 GB of virtual disk storage and the largest virtual machine may use 55 GB of virtual disk storage. Further, the virtual disk I/O may be 1.457.6 KBps for both the smallest and largest virtual machines. The storage attributes for the smallest and largest are provided to help a user configure data storage attributes for a virtual machine. For example, smallest and largest storage attributes guide a user in how much storage should be configured for a new virtual machine.

Figure 7:
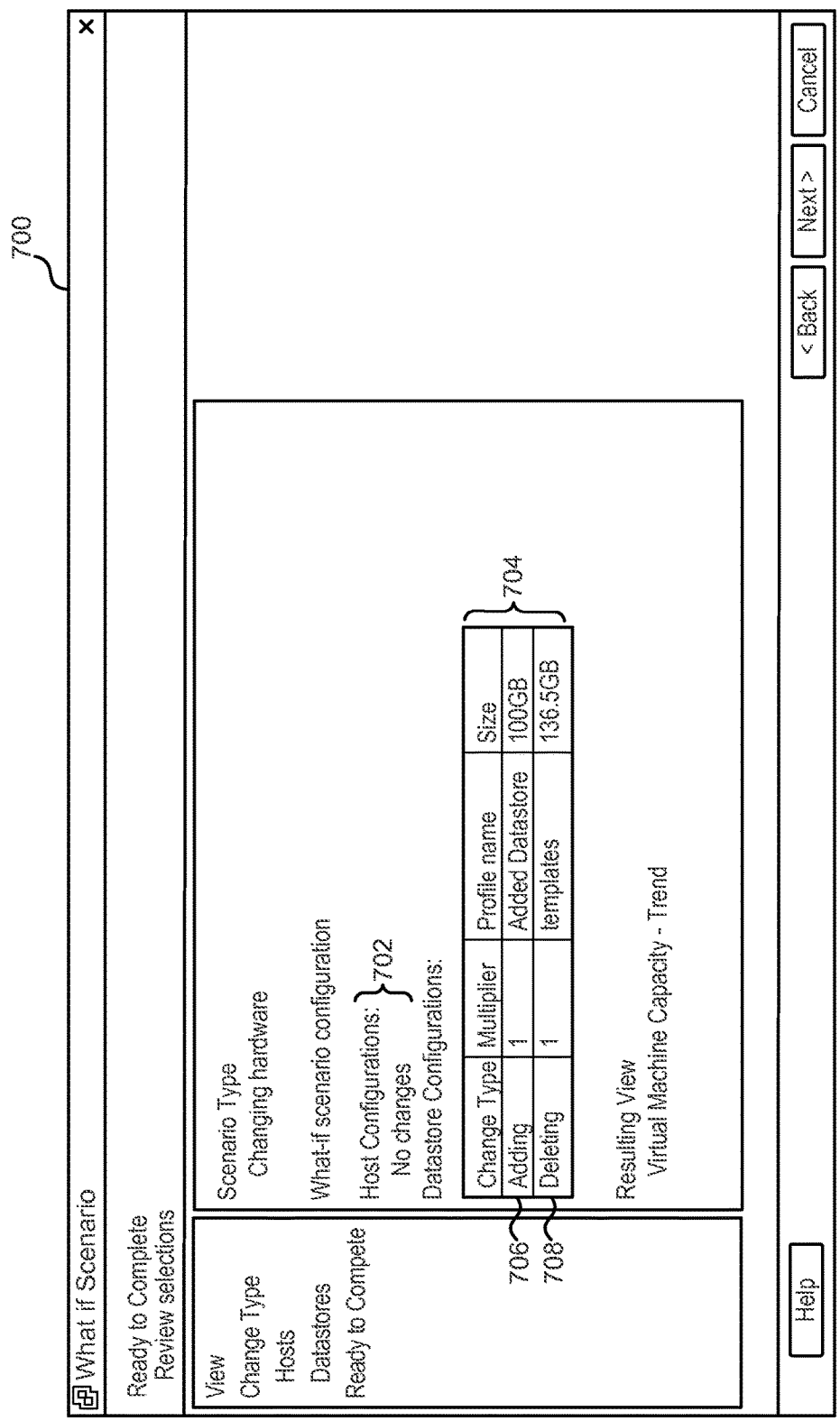
FIG. 7 depicts an interface showing a summary of the changes according to one embodiment.

Referring back to FIG. 3, at 314, changes are submitted and received at capacity management engine 108. A summary of the changes may then be output. For example, FIG. 7 depicts an interface 700 showing a summary of the changes according to one embodiment. In this "what if" configuration, in a section 702, it is indicated no changes to the host configuration are received. However, if changes to the host configuration using interface 500 in FIG. 5 were performed, those changes would be summarized here.

In a section 704, the changes to datastore configurations are summarized. In this case, at 706, one datastore of the name "Added Datastore" was added with a size of 100 GB. Also, at 708, one datastore has been deleted with the name of "templates" and a size of 136.5 GB. When a user has reviewed the changes and is satisfied with the changes, the changes may be submitted and are received at capacity management engine 108.

Referring back to FIG. 3, at 316, the "what if" scenario is visualized based on the changes to the compute capacity and storage capacity. A visualization will be described in more detail below.

Figure 8:
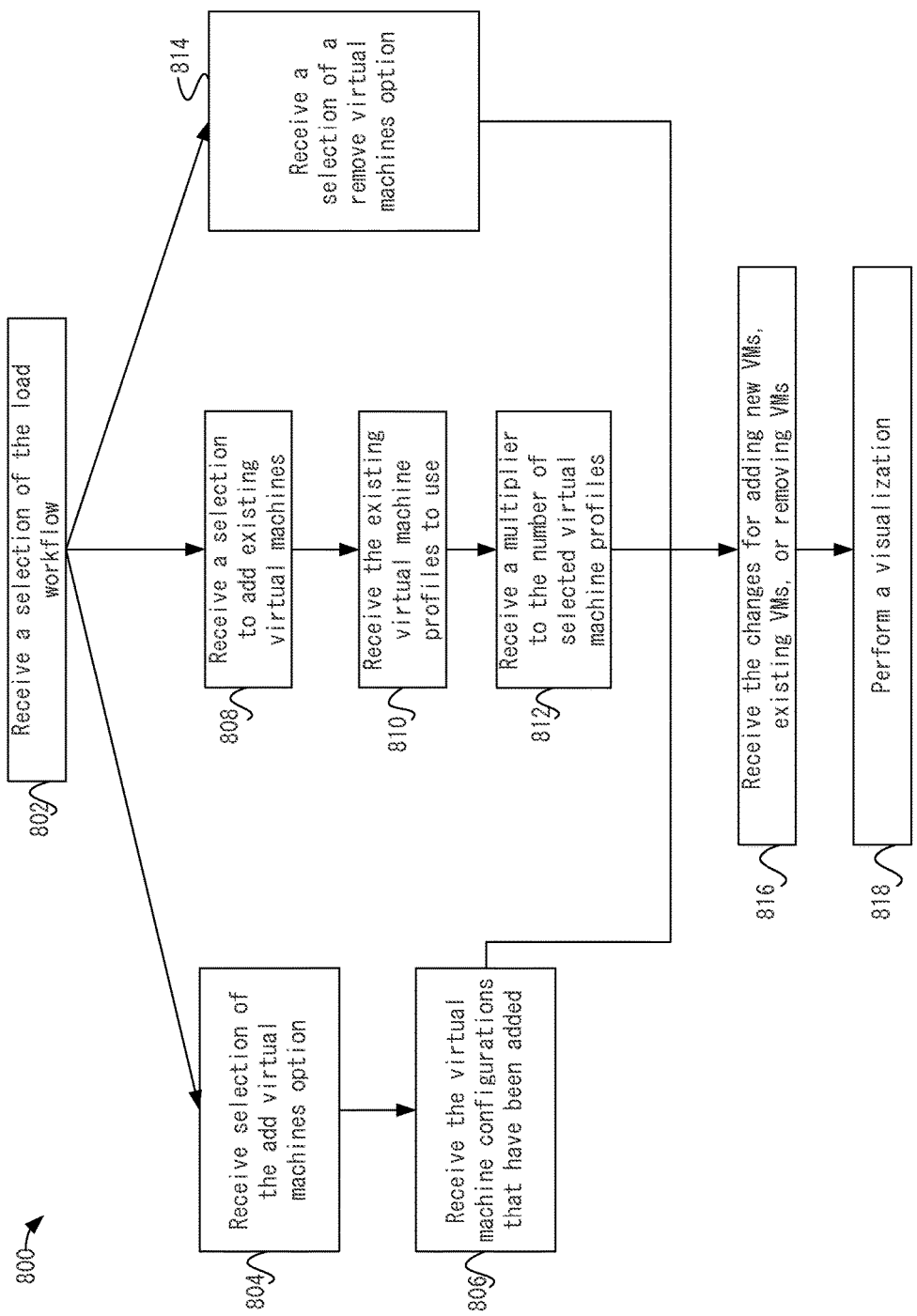
FIG. 8 depicts a simplified flowchart of a method for configuring a load model according to one embodiment.

The configuration of a load model will now be described. FIG. 8 depicts a simplified flowchart of a method for configuring a load model according to one embodiment. Instead of selecting the capacity workflow at 308 in FIG. 3, the load workflow is selected instead. For example, at 802, a selection of the load workflow is received.

Figure 9:
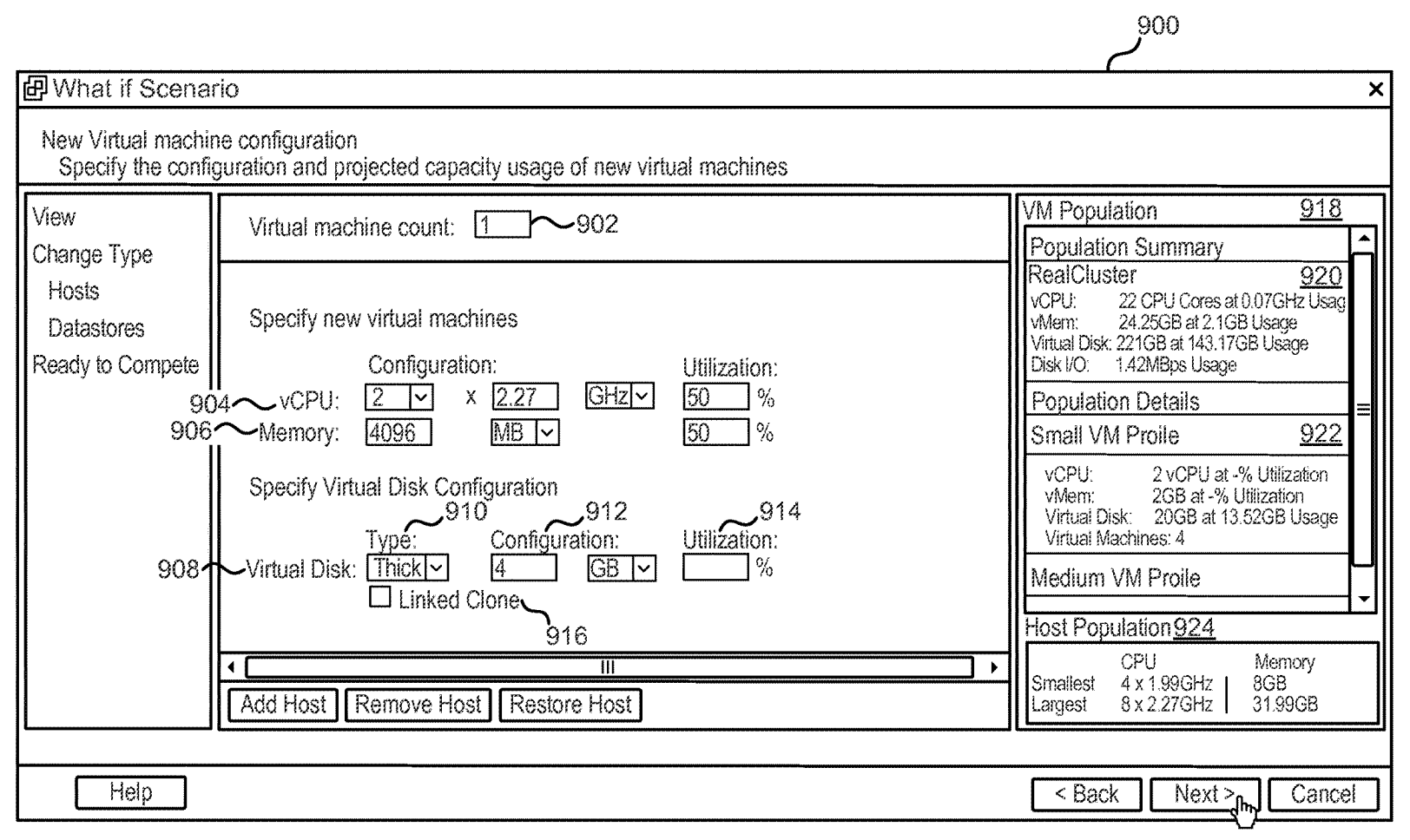

The load workflow allows a user to configure the load that will be used in a "what if" simulation. For example, a user may add virtual machines, use profiles of existing virtual machines to add virtual machines, or remove virtual machines from a capacity container. At 804, the add virtual machines option is selected and received. FIG. 9 shows an interface 900 for adding a new virtual machine configuration according to one embodiment. Different VM attributes may be added. For example, in a "Virtual machine count" section 902, the number of virtual machines to be added with this configuration may be input. In a section 904, a number of virtual CPUs (vCPUs), speed (e.g., in GHz), and utilization for each of the new virtual machines can be configured. The utilization is the percentage of CPU demand for a VM.

In a "Memory" section 906, the memory allocated to the VM is configured. For example, the amount of virtual memory in megabytes (MB) and the utilization may be configured. The utilization is the percentage of memory consumption for a VM.

Datastore attributes may then be configured. The datastore attributes define data storage that is used by VMs. In a "Virtual Disk" section 908, a virtual disk is configured with a type, configuration, and utilization. In a "Type" section 910, a type of virtual disk may be selected. In one embodiment, a thin and thick type may be selected. A thin type is where a utilization of the virtual disk may be specified in a "Utilization" section 914. In this case, the utilization is expressed as a percentage of the amount of storage (shown in a section 912) that configured for the virtual disk. In a thin-type provisioned virtual disk, the percentage utilization is the amount that is used by this virtual machine. For example, if 25% utilization is selected for a 4 GB virtual disk, then the virtual machine uses 1 GB of virtual disk space. In a thick-type provisioning, the full configuration of storage is used by the virtual machine. For example, 4 GB is used by a thick-provisioned virtual disk by the virtual machine. The thin or thick-type provisioning will be taken into account when determining an average virtual machine unit. For example, the amount of storage attributable to a virtual machine in the capacity container may be adjusted based on whether the virtual machine is thin or thick-type provisioned.

A linked clone option may be selected in an entry box 916. When the linked clone option is used, common data is shared among multiple virtual machines. Any differences in data among the virtual machines may be stored for virtual machine specific storage. This may save disk space because data does not need to be replicated for multiple virtual machines and the linked clone option will take the saved disk space into account for each virtual machine when simulating the "what if" scenario. For example, the linked clone option assumes an average savings of 20% capacity. This saving is in addition to the impact of thin-provisioned disk.

In a "VM Population" section 918, a virtual machine population is summarized. In a "Population Summary" section 920, an aggregation of attributes for all VMs of the capacity container "RealCluster" is shown. This shows a summary of the virtual CPU, virtual memory, virtual disk, and disk I/O that is being used by all virtual machines in the RealCluster capacity container.

In a "Population Details" section 922, different profiles for the virtual machines in the RealCluster capacity container are shown. For example, the small VM profile, medium VM profile, and large VM profile (not shown) are included in section 922. For the small VM profile, the vCPU, vMEM, and a virtual disk attributes are shown for the small VM profile. Also, a number of virtual machines that are included in the small VM profile because of their configuration is also shown. For example, different levels of virtual machine profiles may be determined. In one example, small, medium, and/or large VM profiles may be generated based on the attributes of all virtual machines in the capacity container. Depending on the attributes of virtual machines in the capacity container, not all profiles may be generated, such as small and large profiles are generated, but not a medium profile. Different methods may be used to determine the attributes of the small, medium, and large VM profiles; however, the methods generally attempt to determine ranges of values for attributes for three bins that encompass 33% of the values for the virtual machines in the capacity container. The virtual machines are then classified in the bins. If a bin does not include any virtual machines, the bin is not used to create a profile, such as if no virtual machines are found in the medium bin, a medium virtual machine profile is not created. For each bin, attributes are determined based on the virtual machines in the bin. For example, the average or maximum (or some variation thereof) of certain attributes of virtual machines in the bin is determined and used as attributes of the associated profile. The use of small, medium, and large profiles shows a user the distribution of virtual machines in the capacity container. Other methods may also be used to determine the small, medium, and large virtual machine profiles.

In a "Host Population" section 924, attributes of the smallest and largest hosts in the capacity container are shown. This may help the user in determining attributes for virtual machines. For example, virtual machine attributes may be configured to efficiently run on hosts in the capacity container based on the smallest and largest host attributes. However, virtual machines can be configured to be bigger than the largest available host and may be simulated, but the virtual machines may not run efficiently. Referring back to FIG. 8, after configuration, at 806, the virtual machine configurations that have been added by a user are received.

Figure 10:
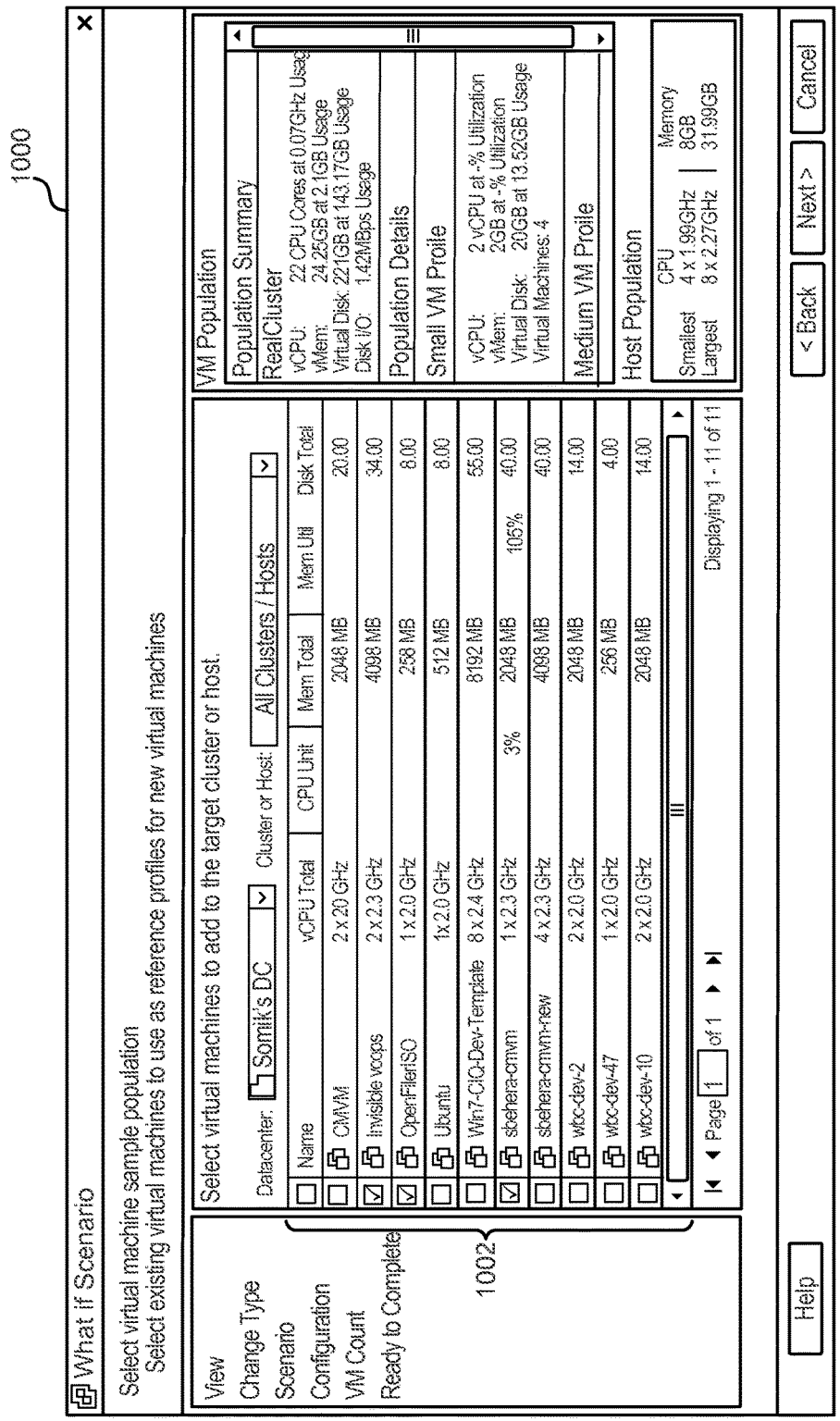
FIG. 10 shows an interface for adding existing virtual machines according to one embodiment.

In another example of the workflow, a selection to add existing virtual machines may be received at 808. At 810, the existing virtual machine profiles to use are received. The specification may be performed using an interface 1000 shown in FIG. 10 for adding existing virtual machines. Profiles for existing virtual machines in the capacity container are listed in a section 1002. Different profiles may then be selected by a user.

Referring back to FIG. 8, after virtual machine profiles selections are received, at 812, a multiplier to the number of selected virtual machine profiles may be received. An interface 1100 shown in FIG. 11 is output when a "next" icon selection is received in interface 1000. In interface 1100, a multiplier to the number of virtual machine profiles that were selected may be input. For example, a "VM Count" column 1102 allows a user to specify the number of virtual machines to include in the capacity container for each VM profile.

Referring back to FIG. 8, in another example in the workflow, at 814, a remove virtual machines option may be selected and received. In this case, virtual machines may be selected to be removed from existing profiles.

After the configuration of adding virtual machines, adding existing virtual machines, or removing virtual machines is performed, at 816, the changes may be submitted to capacity management engine 108. At 818, a visualization may be performed.

Simulation and Visualization

Capacity management engine 108 may perform a simulation and provide a visualization of capacity utilization according to one embodiment. The capacity analysis may take into account storage attributes in the load and capacity models. The load model includes storage attributes for the amount of disk storage used by virtual machines and the capacity model includes storage attributes for the amount of disk storage configured in datastores. Additionally, storage artifacts, such as thin/thick provisioning and linked clones, may be used in the simulation. This process will be described in more detail below.

Figure 12:
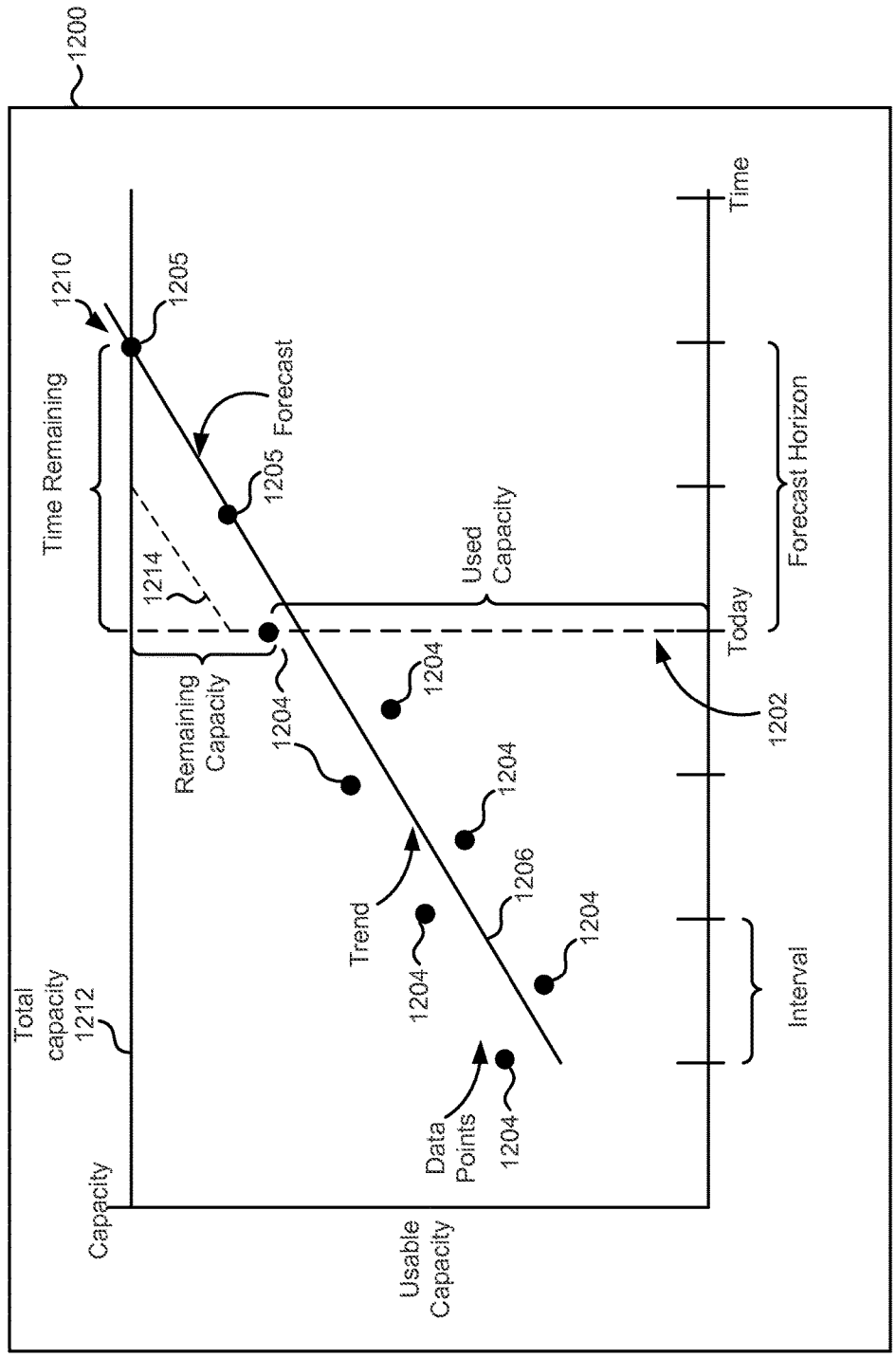
FIG. 12 depicts a graph of a trend and forecast according to one embodiment.

FIG. 12 depicts a graph 1200 of a trend and forecast according to one embodiment. This graph may be an example of a "virtual machine capacity—trend" visualization. A visualization shown in FIG. 2 may also be generated if the "virtual machine capacity—summary" option is selected. Other visualizations may also be appreciated.

In graph 1200, a present date of today is shown at a dividing line 1202. To the left of dividing line 1202 is historical data. To the right of dividing line 1202 is a forecast horizon.

A trend curve 1206 is used to show the trend for historical data and is also projected into the future to yield a forecast. Trend curve 1206 may represent a number of average virtual machines that are using capacity in the capacity container. Different curve-fitting methods may be used to generate trend curve 1206, such as a number of regression analysis techniques that include linear regression, polynomial regression, exponential regression, logarithmic regression, and power regression. Time intervals may be selected that govern how much historical data is used and also how far out in the future to forecast.

A total capacity curve 1212 represents the total capacity that is computed for the capacity container. The total capacity is determined based on the capacity model that is configured. For example, the number of hosts and datastores in the capacity container is used to compute total capacity curve 1212. The total capacity may be computed in average virtual machine units.

The data used to calculate data points 1204 to the left of dividing line 1202 is historical data determined from the performance of resources in infrastructure 104. For example, performance data for physical and virtual computing resources, such as virtual machines, hosts, and datastores, may be determined. This data is fit into a trend to visualize capacity utilization patterns over time. Data points 1205 are forecast into the future based on the historical trend.

A forecast based on the historical data is shown to the right of dividing line 1202. This forecast allows users to determine how much time is remaining until all usable capacity is used. This may allow a user to plan on when extra capacity may need to be added. For example, the difference between total capacity curve 1212 and trend curve 1206 represents the number of average virtual machines that can be added in unused capacity. As shown, trend curve 1206 continues to rise after dividing line 1202 until the total useable capacity is reached at a point 1210. At this time, the number of average virtual machines that can be deployed in the capacity container is zero.

In the workflow discussed above, changes to the capacity container can be simulated in "what if" scenarios. For example, modifications to the capacity container in the capacity and/or load model affect the calculation of trend curve 1206 and/or total capacity curve 1212. In particular, the total available CPU demand capacity, the total CPU demand, the total Memory capacity, the total Memory consumption, the CPU demand of the average virtual machine unit, the Memory consumption of the AVM unit for each time interval, the total storage capacity, and total storage consumption are computed using data for VMs remaining in the modified capacity container and for new VMs that were added to the modified capacity container by the capacity and/or load model. In particular: (a) for existing VMs in the modified capacity container, the data used is the historical data; (b) for a VM added using user-specified attributes, the same attributes are applied over each time interval since there is no historical data; and (c) for a VM added using existing attributes, the data used is historical data.

A modified trend curve 1214 may then be generated. Modified trend curve 1214 may model the changes configured in the "what if" scenario. For example, 10 virtual machines may have been added to the capacity container to simulate the "what if" scenario. The 10 virtual machines may change the average virtual machine that is used. For example, if the virtual machines added are all large VMs, then the average virtual machine attributes may be increased. Once the 10 virtual machines have been added, capacity manager 108 may determine usage data for the 10 virtual machines. This may change the amount of available capacity in the capacity container. Also, capacity manager 108 determines a new number of average virtual machines that may be fit into available capacity. In this case, the additional of 10 virtual machines cases modified trend curve 1214 to reach total capacity faster. Other modifications may also be simulated, such as the addition/deletion of hosts and data stores.

Different storage attributes may be used to determine the trend and forecast. For example, when determining a number of average virtual machines that can fit in available capacity, data storage attributes are analyzed. In the simulation, other attributes, such as CPU and memory, may also be analyzed separately. For example, CPU, memory, and storage are each analyzed to determine a number of average virtual machines that can be fit on available capacity. The lowest number of virtual machines may then be selected.

For the CPU attribute, the average virtual machine may be fit on hosts to determine a number of average virtual machines that can be included in the available CPU capacity on the hosts. For example, if a cluster is being used and has 10 GHz of available CPU capacity, an average virtual machine having 1.5 GHz of CPU demand would fit 6 average virtual machines on the cluster. Also, if available memory capacity is 8 GB and the average virtual machine has 1 GB of memory demand, 8 average virtual machines may be fit on the cluster. The storage analysis will be described in more detail below; however briefly, the hosts may have access to 100 GB of virtual disk space. If an average virtual machine has 20 GB of storage demand, then 5 average virtual machines may be fit onto hosts. The minimum number of virtual machines for the three attributes is then selected as the amount of new virtual machines that can be deployed. Other ways of determining the fit may also be used. For example, all three attributes may be simulated together.

Figure 13:
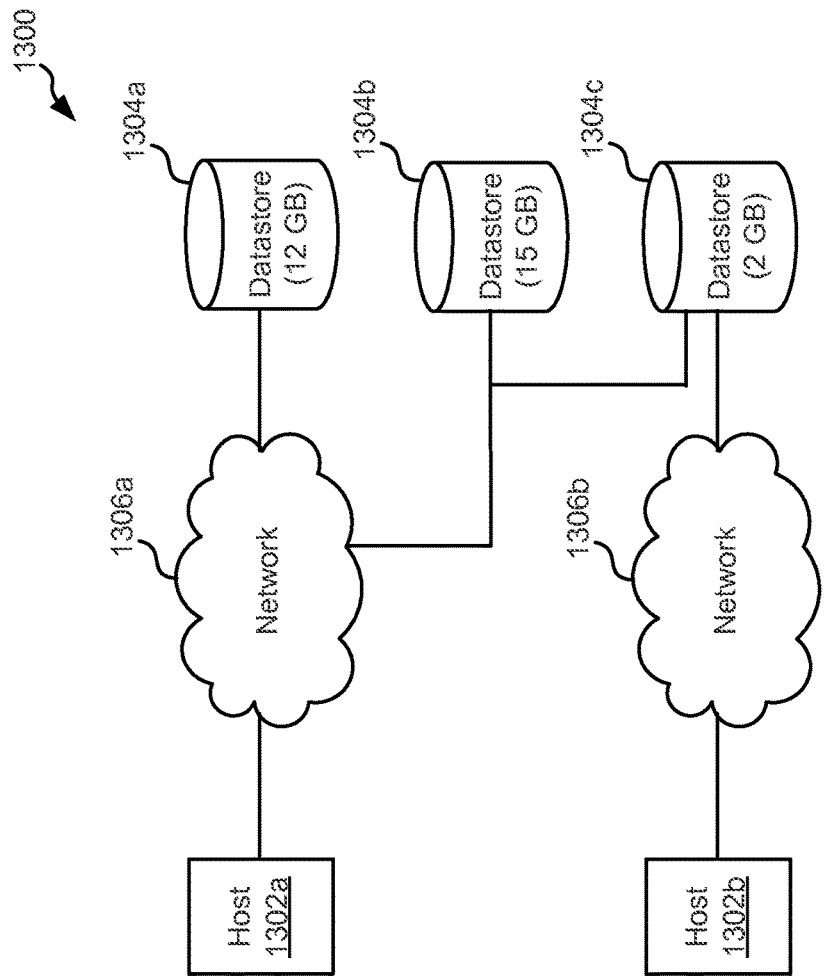
FIG. 13 shows an example of a topology according to one embodiment.

The storage simulation will now be described in more detail. A topology including interconnections between hosts and datastores may be used to determine the fitting. FIG. 13 shows an example of a topology 1300 according to one embodiment. Topology 1300 may represent a virtual topology of the physical infrastructure. In topology 1300, hosts 1302 may be coupled to datastores 1304 through networks 1306. As shown, host 1302*a* is connected through network 1306 to datastores 1304*a*, 1304*b*, and 1304*c*. Also, host 1302*b* is connected through network 1306*b* to datastore 1304*c*.

In one example, hosts may be connected to all datastores 1304. For example, when a new host 1302 is added to a capacity container, the default may be to connect new host 1302 to all datastores 1304. Thus, the newly added host may access available storage from any datastore 1304.

Also, the connections to datastores 1304 may be configured. For example, a user may specify a host 1302 is connected to specific datastores 1304. Also, the connections may be automatically determined based on the physical or virtual infrastructure.

In a simplified version of the fitting process, an average virtual machine may be placed on a host 1302 and tests are run to determine if the fit is optimal. For example, an average virtual machine may be placed on host 1302*b* in the fitting process.

The storage attributes for the average virtual machine are tested. In this example, the average virtual machine has a 4 GB storage requirement. Host 1302*b* is only connected to datastore 1304*c* through topology 1300 and datastore 1304*c* has 2 GB of available storage. Capacity management engine 108 determines that the average virtual machine cannot be fit on host 1302*b* because host 1302*b* does not have access to enough available storage. Thus, the fitting process attempts to find another host 1302 in which to fit the average virtual machine.

The average virtual machine may then be fit on host 1302*a*. In this case, host 1302*a* is connected to datastores 1304*a*, 1304*b*, and 1304*c*. Capacity management engine 108 determines host 1302*a* has access to enough available storage to meet the storage requirements of the average virtual machine. Capacity management engine 108 may then place the average virtual machine on host 1302*a*. Capacity management engine 108 may also note which datastore 1304 will have storage used by the placed average virtual machine. For example, the available storage in datastore 1304*a* may be reduced by 4 GBs.

The above fitting process may continue until a number of average virtual machines is fit onto hosts 1302. Also, different iterations may be performed to find the optimal placement of average virtual machines on hosts 1302.

In one embodiment, capacity may be calculated for shared storage. For example, host 1302a may be part of a first cluster 1 and host 1302b may be part of a second cluster 2. Cluster 1 and cluster 2 are attached to shared storage, such as datastore 1304c. Cluster 1 has 10 virtual machines with an average 100 GB of storage usage per virtual machine. Cluster 2 has 10 virtual machines with an average 200 GB of storage usage per virtual machine. For discussion purposes, datastore 1304c includes a capacity of 5000 GB.

The total shared storage usage is 3000 GB by both clusters. That leaves remaining raw capacity of 2000 GB. The number of average virtual machines for each cluster differs because of the different characteristics of the average virtual machines on the clusters. For example, cluster 1 has a number of average virtual machines of 20 average virtual machines for the storage attribute. That is, 2000 GB remaining storage/100 GB storage usage=20 average virtual machines remaining. Cluster 2 has a number of average virtual machines of 10 average virtual machines for the storage attribute. That is, 2000 GB remaining storage/200 GB storage usage=10 average virtual machines remaining. When determining available capacity, if cluster 1 is being analyzed, the available capacity may be 20 average virtual machines. If cluster 2 is being analyzed, the available capacity may be 10 average virtual machines.

In the above example, the average virtual machine was assumed to have a storage requirement of 4 GB. That requirement may be determined based on storage related artifacts, such as thin provisioning, thick provisioning, and linked clone artifacts. For example, when a thin provisioning is used for a virtual machine, the amount of storage needed is reduced by the utilization percentage. The use of one of the artifacts may thus adjust what the storage requirements are for the average virtual machine.

Figure 14:
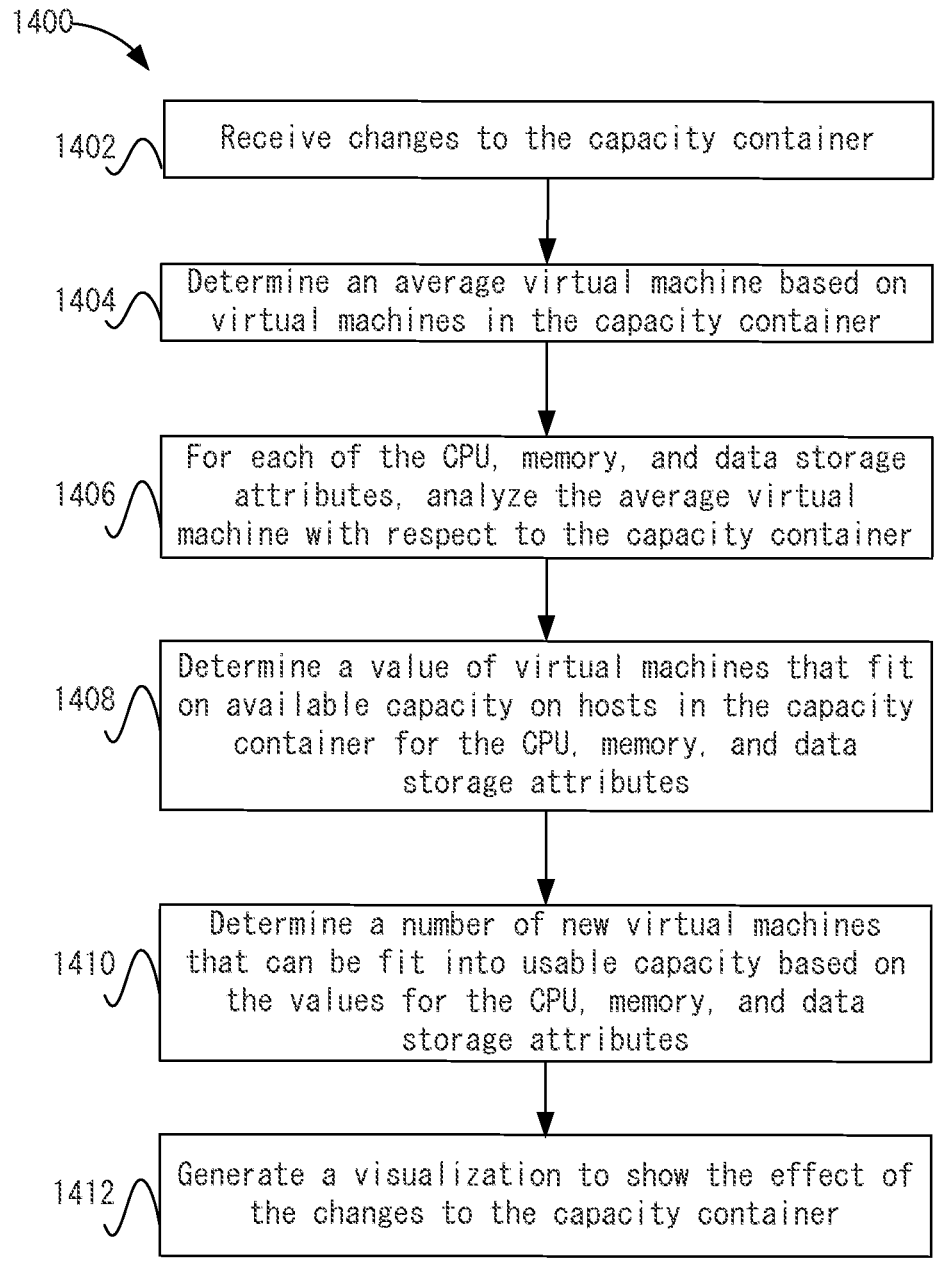
FIG. 14 depicts a simplified flowchart of a method for performing a capacity analysis according to one embodiment.

FIG. 14 depicts a simplified flowchart 1400 of a method for performing a capacity analysis according to one embodiment. At 1402, changes to the capacity container are received. For example, virtual machines, hosts, and/or data stores may be configured.

At 1404, an average virtual machine is determined based on virtual machines in the capacity container. For example, the changes to the capacity container may be used to determine new values for the average virtual machine.

At 1406, for each of the CPU, memory, and data storage attributes, the average virtual machine is analyzed with respect to the capacity container. At 1408, a value of virtual machines that fit on available capacity on hosts in the capacity container is determined for the CPU, memory, and data storage attributes.

At 1410, a number of new virtual machines that can be fit into available capacity is determined based on the values for the CPU, memory, and data storage attributes. For example, the lowest value of virtual machines among the CPU, memory, and data storage attributes is determined.

At 1412, a visualization is generated to show the effect of the changes to the capacity container.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable storage media. The term computer readable storage medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and datastores are some-what arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
   determining a capacity model that configures computing resource capacity for a capacity container;
   determining a load model that configures load for the capacity container;
   estimating an available capacity in the capacity container based at least in part on a capacity of a plurality of host devices in the capacity container, each of the plurality of host devices comprising one or more virtual machines executing thereon;
   fitting a profile of a virtual machine into the available capacity;
   determining a quantity of virtual machines based on the fitting;
   upon determining the quantity of virtual machines based on the fitting, receiving a request to perform one or more of the following: add a host device, remove a host device, or restore a host device previously deleted in the capacity container;
   based on adding a host device, removing a device host, or restoring a host device previously deleted in the container, estimating a second available capacity in the capacity container;
   fitting the profile of the virtual machine into the second available capacity; and
   determining a second quantity of virtual machines based on the fitting.

2. The method of claim 1, further comprising:
   upon determining a second quantity of virtual machines based on the fitting, receiving a request to add one or more virtual machines;
   upon adding the one or more virtual machines, estimating a third available capacity in the capacity container;
   fitting the profile of the virtual machine into the third available capacity; and
   determining a third quantity of virtual machines based on the fitting.

3. The method of claim 1, wherein the virtual machine unit is an average virtual machine determined based on virtual machine attributes for a set of virtual machines.

4. The method of claim 1, wherein the fitting process places a virtual machine on a host device, and the fitting process determines if a storage requirement for the virtual machine is satisfied by an amount of storage in a storage component accessible to one or more host devices in the container.

5. The method of claim 1, wherein estimating the available capacity is based on the capacity model and historical usage data of capacity based on a set of virtual machines in the capacity container, the available capacity being capacity available for deployment of new virtual machine units in the capacity container.

6. The method of claim 1, wherein the capacity model comprises a set of storage components, wherein storage components are coupled to host devices in a topology, wherein the fitting comprises:
   placing the virtual machine unit on a host device in the plurality of host devices;
   determining if the host device has access to enough available storage in one or more storage components coupled to the host device in the topology; and
   determining the virtual machine unit fits on the host device if the host device has access to enough available storage.

7. The method of claim 1, wherein: the computing resource capacity includes a data storage attribute that includes a storage artifact, the storage artifact is an option for data storage in a storage component, and the option is used to estimate an amount of data storage in a storage component needed by the virtual machine unit.

8. The method of claim 7, wherein the option comprises a thin provisioning, a thick provisioning, or a linked clone provisioning.

9. The method of claim 1, further comprising outputting a visualization of the quantity of virtual machine units based on the fitting, the visualization showing a trend curve of historical capacity usage shown in virtual machine units and a forecast curve based on the determined quantity of virtual machine units.

10. A system comprising:
   a capacity model that configures computing resource capacity for a capacity container;
   a load model that configures load for the capacity container; and
   a processor programmed to:
      estimate an available capacity in the capacity container based at least in part on a capacity of a plurality of host devices in the capacity container, each of the plurality of host devices comprising one or more virtual machines executing thereon;
      fit a profile of a virtual machine into the available capacity;
      determine a quantity of virtual machines based on the fitting;
      upon determining the quantity of virtual machines based on the fitting, receive a request to perform one or more of the following: a) add a host device, remove a host device, or restore a host device previously deleted in the container, and b) add a datastore, remove a datastore, or change an existing datastore;
      based on the received request, estimating a second available capacity in the capacity container;

fitting the profile of the virtual machine into the second available capacity; and determining a second quantity of virtual machines based on the fitting.

11. The system of claim 10, wherein the processor is further programmed to:

upon determining a second quantity of virtual machines based on the fitting, receive a request to add one or more virtual machines;

upon adding the one or more virtual machines, estimate a third available capacity in the capacity container;

fit the profile of the virtual machine into the third available capacity; and determine a third quantity of virtual machines based on the fitting.

12. The system of claim 10, wherein the virtual machine unit is an average virtual machine determined based on virtual machine attributes for a set of virtual machines.

13. The system of claim 10, wherein the fitting process places a virtual machine on a host device, and the fitting process determines if a storage requirement for the virtual machine is satisfied by an amount of storage in a storage component accessible to one or more host devices in the container.

14. The system of claim 10, wherein estimating the available capacity is based on the capacity model and historical usage data of capacity based on a set of virtual machines in the capacity container, the available capacity being capacity available for deployment of new virtual machine units in the capacity container.

15. The system of claim 10, wherein the capacity model comprises a set of storage components, wherein storage components are coupled to host devices in a topology, wherein the fitting comprises:

placing the virtual machine unit on a host device in the plurality of host devices;

determining if the host device has access to enough available storage in one or more storage components coupled to the host device in the topology; and determining the virtual machine unit fits on the host device if the host device has access to enough available storage.

16. One or more non-transitory computer-readable media comprising instructions that when executed by a processor, cause the processor to:

determine a capacity model that configures computing resource capacity for a capacity container;

determine a load model that configures load for the capacity container;

estimate an available capacity in the capacity container based at least in part on a capacity of a plurality of host devices in the capacity container, each of the plurality of host devices comprising one or more virtual machines executing thereon;

fit a profile of a virtual machine into the available capacity;

determine a quantity of virtual machines based on the fitting;

upon determining the quantity of virtual machines based on the fitting, receive a request to perform one or more of the following: a) add a host device, remove a host device, or restore a host device previously deleted in the container; and b) add a datastore, remove a datastore, or change an existing datastore;

based on the received request, estimate a second available capacity in the capacity container;

fit the profile of the virtual machine into the second available capacity; and determine a second quantity of virtual machines based on the fitting.

17. The non-transitory computer-readable media claim 16, wherein the instructions further cause the processor to:

upon determining a second quantity of virtual machines based on the fitting, receive a request to add one or more virtual machines;

upon adding the one or more virtual machines, estimate a third available capacity in the capacity container;

fit the profile of the virtual machine into the third available capacity; and determine a third quantity of virtual machines based on the fitting.

18. The non-transitory computer-readable media of claim 16, wherein the virtual machine unit is an average virtual machine determined based on virtual machine attributes for a set of virtual machines.

19. The non-transitory computer-readable media of claim 16, wherein the fitting process places a virtual machine on a host device, and the fitting process determines if a storage requirement for the virtual machine is satisfied by an amount of storage in a storage component accessible to one or more host devices in the container.

20. The non-transitory computer-readable media of claim 16, wherein estimating the available capacity is based on the capacity model and historical usage data of capacity based on a set of virtual machines in the capacity container, the available capacity being capacity available for deployment of new virtual machine units in the capacity container.

\* \* \* \* \*